March 8, 1949. K. RANDALL 2,463,715
VENTILATOR FOR VEHICLE BODIES
Filed Aug. 14, 1944 2 Sheets-Sheet 1

Inventor
Kenneth Randall
By Fred Gerlach
Atty

March 8, 1949. K. RANDALL 2,463,715
VENTILATOR FOR VEHICLE BODIES
Filed Aug. 14, 1944 2 Sheets-Sheet 2
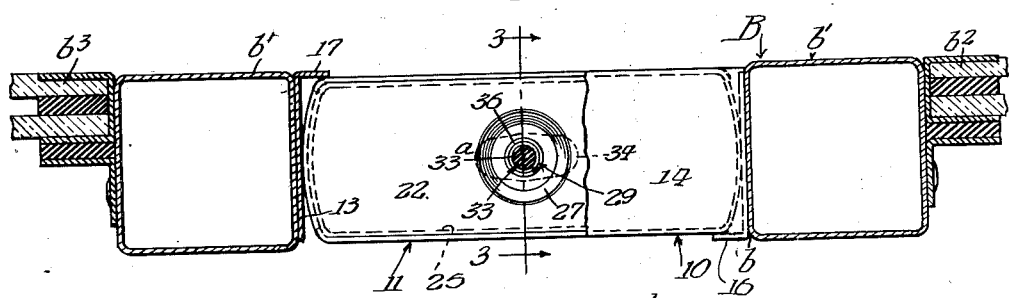
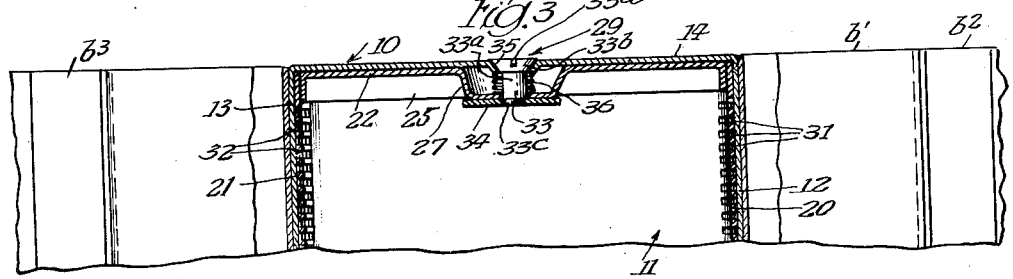
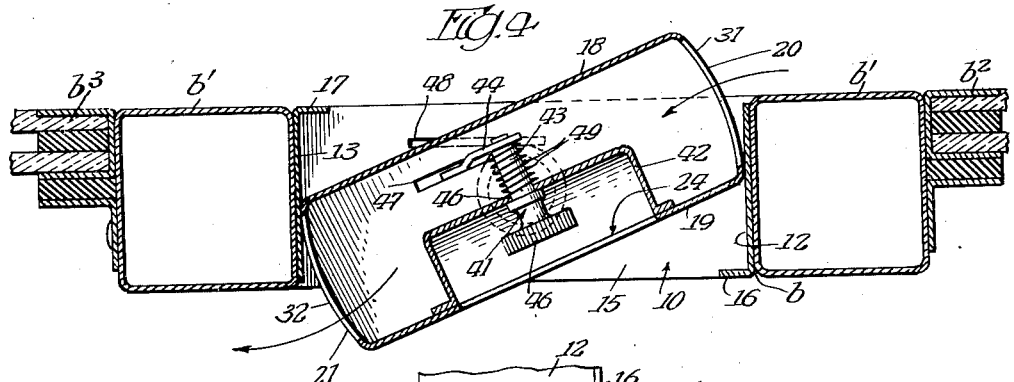
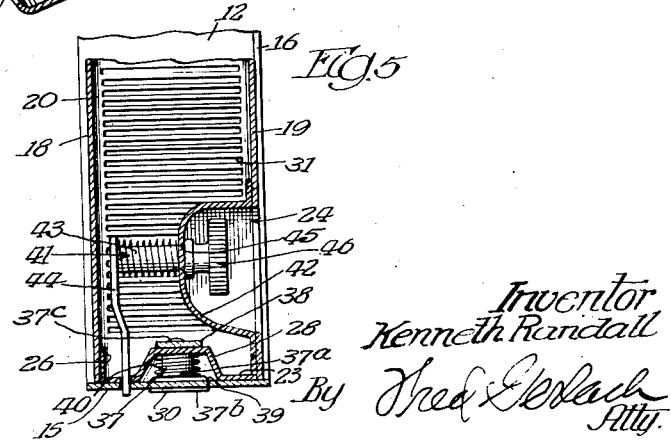
Inventor
Kenneth Randall Patented Mar. 8, 1949

2,463,715

UNITED STATES PATENT OFFICE 2,463,715

VENTILATOR FOR VEHICLE BODIES

Kenneth Randall, Wayne, Mich., assignor to Consolidated Vultee Aircraft Corporation, San Diego, Calif., a corporation of Delaware Application August 14, 1944, Serial No. 549,320

6 Claims. (Cl. 98—13)

The present invention relates generally to ventilators. More particularly the invention relates to that type of ventilator which is designed and adapted for use with a vehicle body having an opening in one of the side walls thereof and comprises a ventilator member which is shaped conformably to, and fits within, the opening and is pivoted to swing about its longitudinal center so that it is capable of being swung or shifted back and forth between a closed position wherein it extends across the opening and substantially closes the latter against entry of outside air into the body of the vehicle and an open position wherein it is so angularly disposed with respect to the adjacent side wall of the vehicle that its leading portion is disposed exteriorly of the body and its trailing portion is disposed interiorly of the body and such portions coact in connection with forward travel of the vehicle to direct outside air into the vehicle body for ventilating purposes.

One object of the invention is to provide a ventilator of this type which is an improvement upon, and has certain advantages over, previously designed ventilators of the same general character and is characterized by the fact that the pivotally mounted ventilator member serves when in its open position not only to direct outside air into the vehicle body but also to strain the deflected outside air so as to rid it of dust and other foreign matter.

Another object of the invention is to provide a ventilator of the last mentioned character in which the ventilator member is in the form of a vertically positioned tube which is substantially rectangular in cross section, embodies spaced apart substantially imperforate side walls which when the tube is in its closed position are disposed in parallel relation with the adjacent side wall of the vehicle body, and has in its front and rear walls minute apertures which when the tube-formed ventilator member is in its open position permit outside air to flow through the tube into the interior of the vehicle body while at the same time they filter the deflected air so as to rid it of dust and other foreign matter.

A further object of the invention is to provide a ventilator of the type and character under consideration which embodies simple means for yieldingly holding the tube-formed ventilator member in the various angular positions into which it is shifted and has within the member releasable latch means for positively locking said member in its closed position.

A further object of the invention is to provide a vehicle body ventilator which is generally of new and improved construction, may be manufactured at a low and reasonable cost and is characterized by high efficiency as well as the fact that the tube formed ventilator member when in its closed position serves completely to seal the opening in which it is mounted.

Other objects of the invention and the various advantages and characteristics of the present ventilator will be apparent from a consideration of the following detailed description.

The invention consists in the several novel features which are hereinafter set forth and are more particularly defined by claims at the conclusion hereof.

In the drawings which accompany and form a part of this specification or disclosure and in which like letters and numerals of reference denote corresponding parts throughout the several views:

Figure 2 is a top plan view of the ventilator showing the tube-formed ventilator member in its closed position wherein it extends across and serves to close the opening in which it is pivotally mounted;

Figure 3 is a vertical longitudinal section of the upper portion of the ventilator;

Figure 4 is a horizontal section taken on the line 4—4 of Figure 1; and

Figure 5 is a vertically transverse section of the lower portion of the ventilator.

Figure 1:
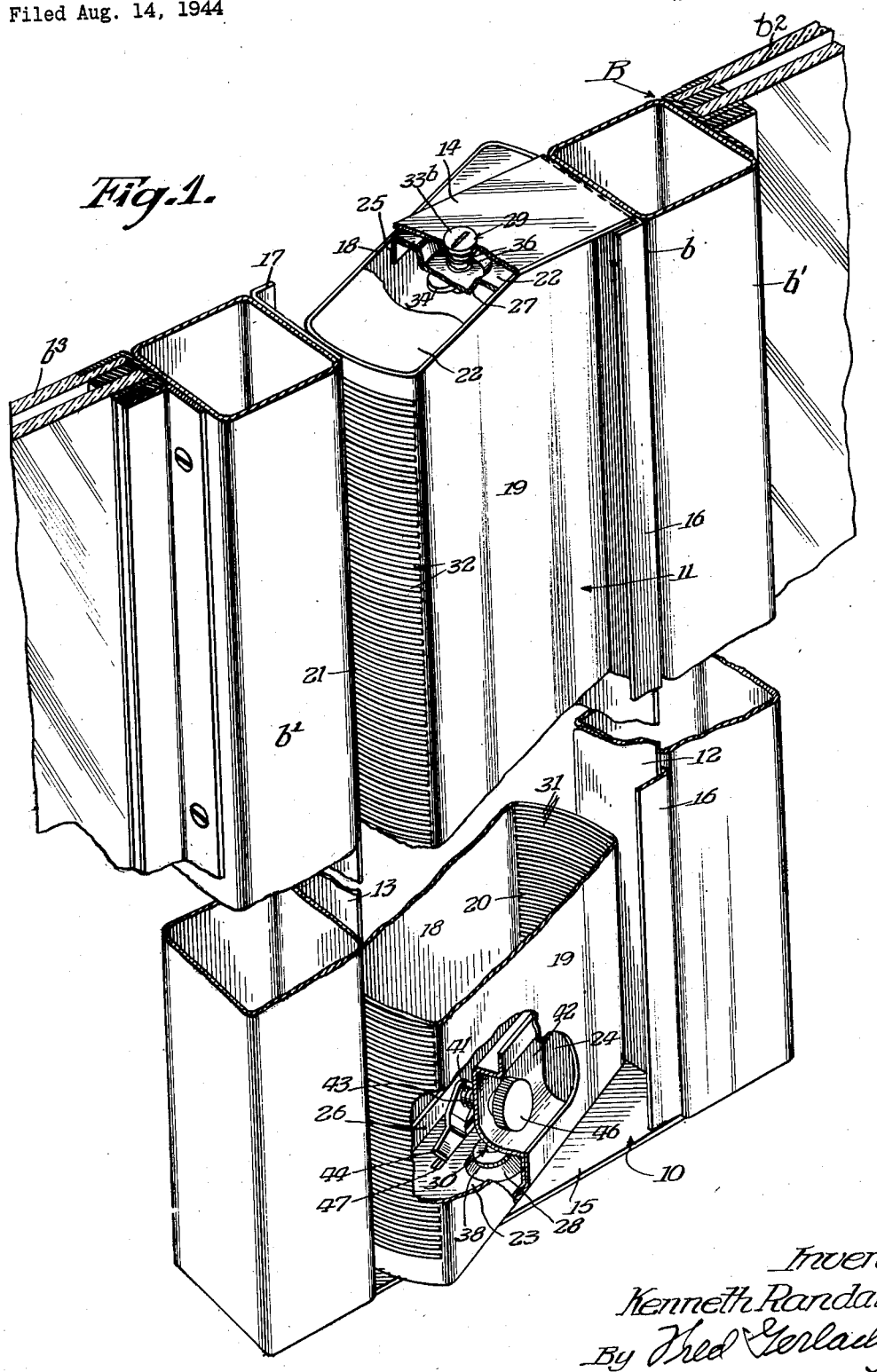
Figure 1 is a fragmentary perspective of a vehicle body having applied thereto a ventilator embodying the invention, the tube-formed ventilator member being shown in its open position wherein it is so angularly disposed that it serves to direct outside air into the vehicle body for ventilating purposes.

The ventilator which is shown in the drawings constitutes the preferred form or embodiment of the invention. It is illustrated in connection with a vehicle body B having a vertically extending rectangular opening $b$ in one of the side walls thereof and, as hereinafter described, serves as an adjustable medium or instrumentality for deflecting any desired quantity or amount of outside air into the interior of the vehicle body via the opening $b$. The body B may be that of an automobile, a railroad passenger car, an airplane, or any other vehicle which is subject to forward travel. The opening $b$ in the one side wall of the vehicle body B is formed by a pair of upstanding tubular columns $b^1$ and these, as shown in Figure 1, are spaced one ahead of the other. A permanently closed window $b^2$ is located in front of the forwardly disposed column and a permanently closed window $b^3$ is located directly behind the rearwardly disposed column. As its principal parts the improved ventilator comprises a rectangular frame 10 and a ventilator member 11.

The frame 10 corresponds in shape to, and is mounted within, the opening $b$ in the vehicle body B and consists of a vertically elongated front piece 12, a vertically elongated rear piece 13, a horizontally disposed top piece 14 and a horizontally disposed bottom piece 15. It is preferably formed of sheet metal and surrounds the ventilator member 11. The front and rear pieces 12 and 13 of the frame 10 fit flatly against the opposed or oppositely facing side parts of the columns $b^1$ of the vehicle body and are secured thereto by screws or other removable attaching devices (not shown) in order that the frame and ventilator member may be removed from its operative or normal position, if desired. The front piece 12 is provided along its inner margin with an integral rearwardly extending right angle flange 16 and the rear piece 13 is provided along its outer margin with an integral forwardly projecting right angle flange 17. The flange 16 and the front piece 12 are coextensive, i. e., they are the same in length and the same is true of the flange 17 and the rear piece 13. The top piece 14 of the frame 10 extends between and has its ends joined to the upper margins of the front and rear pieces of the frame and the bottom piece 15 extends between and has its ends joined to the lower margins of said front and rear pieces of the frame.

The ventilator member 11 is in the form of a vertically positioned tube and, as best shown in Figures 1, 2 and 4, is substantially rectangular in cross section. It is shaped conformably to, and fits within, the frame 10 and consists of an outer side wall 18, an inner side wall 19, a front wall 20, a rear wall 21, a top wall 22 and a bottom wall 23. Such walls are preferably formed of sheet metal and are of such thickness that they are substantially rigid. The outer side wall 18 is imperforate. It is shaped conformably to the inner side wall 19 and is spaced from the latter by the front and rear walls 20 and 21 which, as shown in Figures 1, 2 and 4, have the side margins thereof joined to the vertical margins of the outer and inner side walls. The lower portion of the inner side wall 19 has a centrally disposed horizontally elongated hand opening 24 in order that ready access may be had through it to the interior of the ventilator member 11. The top wall 22 serves as a closure for the upper end of the ventilator member 11 and embodies a continuous depending marginal flange 25 which fits within, and is suitably secured to, the upper marginal portions of the walls 18, 19, 20 and 21. The bottom wall 23 serves to close the lower end of the ventilator member 11 and embodies a continuous upwardly extending marginal flange 26 which fits within, and is suitably secured to, the lower marginal portions of said side walls 18, 19, 20 and 21. The top wall 22 has at the central portion thereof a down-struck portion 27 and such portion is in vertical alignment with an up-struck central portion 28 on the bottom wall 23.

The tube-formed ventilator member 11 is mounted by way of an upper pivot device 29 and a lower pivot device 30 so that it is rotatable about its vertical or longitudinal center and hence is capable of being swung or shifted back and forth between a closed position wherein the inner and outer side walls 18 and 19 thereof are in parallel relation with the side edges of the top and bottom pieces 14 and 15 of the frame 10 and serve substantially to close the frame opening and prevent inflow of outside air into the vehicle body through the frame, as shown in Figure 2, and an open position wherein it is so angularly disposed with respect to the frame that its leading portion, including the front wall 20, is exteriorly disposed with respect to the frame and its trailing portion, including the rear wall 21, is disposed interiorly of the frame, as shown in Figures 1 and 4. When the tube-formed ventilator member 11 is in its closed position the rear margin of the outer side wall 18 abuts against the forwardly projecting flange 17 along the outer margin of the rear piece 13 of the frame and the front margin of the inner side wall 19 abuts against the rearwardly projecting flange 16 along the inner side margin of the front piece 12 of the frame 10 and hence the ventilator member is in substantially sealed relation with the frame and serves to preclude outside air from entering the interior of the vehicle body B via the opening or space within the frame 10. The front and rear walls 20 and 21 of the ventilator member 11 are transversely curved, as shown in Figure 4, so as to permit of ready swinging of the ventilator member back and forth between its closed and open positions. The front wall 20 is provided with a vertical series of closely spaced transversely extending slot-like apertures 31 and these extend to the side margins of the front wall and permit outside air to flow into the interior of the ventilator member when the latter is in its open position. The series of slot-like apertures 31 extends from the upper margin of the front wall 20 to the lower margin. The rear wall 21 of the tube-formed ventilator member 11 is provided with a vertical series of closely spaced slot-like apertures 32 and these extend to the side margins of the rear wall 21 and permit the outside air which flows into the interior of the member 11 via the apertures 31 when the member is in its open position to flow into the interior of the vehicle body B. The apertures 31 and 32 are preferably so minute that they serve in connection with inflow of outside air into the interior of the vehicle body while the member is in its open position to strain or filter the air and thus rid it of dust and other foreign matter. When the member 11 is in its open position during forward travel of the vehicle the outside air which is directed towards the front wall 20 passes into the interior of the member 11 via the apertures 31 and then is rearwardly and inwardly deflected by the outer side wall 18 so that it passes through the exposed portions of the apertures 32 into the interior of the vehicle body for ventilating purposes. The amount of angularity of the member 11 with respect to the frame when the member is in its open position determines the amount of outside air which enters the interior of the vehicle body via the member. If but a small amount of outside air is desired within the interior of the vehicle body B the tube-formed member 11 is swung so that only a portion of the front wall 20 is exposed, i. e., is exteriorly positioned with respect to the frame 10. On the other hand, if a greater quantity of air is desired within the vehicle body the member 11 is swung to a greater angular extent so as fully or completely to expose said front wall 20.

The upper pivot device 29 comprises a bolt 33 and a nut 34. It extends between the top piece 14 of the rectangular frame 10 and the top wall 22 of the tube-formed ventilator member 11. The bolt 33 of the device 29 is positioned vertically and embodies a cylindrical shank 33ª having a downwardly tapered head 33ᵇ at its upper end and an externally threaded reduced stem 33ᶜ at its lower end. As shown in Figure 3 the head of the bolt is disposed in a downwardly tapered hole 35 in the central portion of the frame top piece 14 and the shank extends through a circular hole in the center of the down-struck portion 27 at the central portion of the top wall 22 of the ventilator member 11. The nut 34 underlies the bottom face of said down-struck central portion of the top wall 22 and is mounted on the externally threaded reduced stem 33ᶜ. The head 33ᵇ of the bolt 33 is provided with a kerf 33ᵈ in order that a screw driver or like turning tool may be applied to it when it is desired to rotate the bolt relatively to the nut either in connection with assembly of the pivot device 29 or removal of such device. A spiral compression spring 36 surrounds the shank 33ª of the bolt 33 and is arranged so that the upper end thereof abuts against the portion of the frame top piece 14 that defines the hole 35 and the lower end thereof abuts against the upper surface of the down-struck central portion of the top wall 22 of the ventilator member. Such spring operates to urge the down-struck central portion of the top wall 22 of the ventilator member 11 downwards into gripping relation with the nut 34 of the upper pivot device 29. Because of such operation on the part of the spring and the fact that the bolt and nut of the pivot device 29 remain stationary so far as the ventilator frame 10 is concerned the ventilator member 11 tends to remain in the various angular positions into which it is adjusted. In other words the spring 36 produces a so-called frictional drag which resists turning of the ventilator member 11 and thus tends to hold the member in its various adjusted positions.

The lower pivot device 30 is truly vertically aligned with the upper pivot device 29 and extends between the bottom piece 15 of the rectangular frame 10 and the bottom wall 23 of the tube-formed ventilator member 11. It is the same in design or construction as the upper pivot device and comprises a bolt 37 and a nut 38. The bolt extends vertically and embodies a cylindrical shank 37ª having an upwardly tapered head 37ᵇ at its lower end and an externally threaded reduced stem 37ᶜ at its upper end. The head 37ᵇ fits within an upwardly tapered or countersunk hole 39 in the central portion of the frame bottom piece 15 and the shank 37ª extends through a centrally disposed circular hole in the up-struck central portion 28 of the bottom wall 23 of the ventilator member 11. The nut 38 is mounted on the stem 37ᶜ and bears against the upper surface of said up-struck portion 28. A spiral compression spring 40 surrounds the shank 37ª of the bolt 37 and is arranged so that the lower end thereof abuts against the portion of the frame bottom piece 15 that defines the central hole 39 and its upper end abuts against the lower surface of the up-struck portion 28. Such spring 40 functions in the same manner as the compression spring 36 and assists the latter in maintaining the tube-formed ventilator member 11 in the various angular positions into which it is shifted.

In addition to the parts heretofore mentioned the ventilator comprises a releasable latch device 41 for positively locking the ventilator member 11 in its closed position. This latch device is disposed in the lower portion of the interior of the ventilator member 11 and is accessible via the hand opening 24 in the lower portion of the inner side wall 19 of said member 11. It is carried by a sheet metal bracket member 42 and comprises a horizontally extending rock shaft 43 and a latch arm 44. The bracket member 42 is disposed directly behind the hand opening 24 and has end flanges 42ª which are welded or otherwise fixedly secured to the portions of the inner side wall 19 that define the upper and lower portions of said hand opening 24. The rock shaft 43 extends through a hole 45 in the central portion of the bracket 42. It extends at right angles to the outer and inner side walls 18 and 19 of the ventilator member 11 and embodies at the end thereof that is adjacent the hand opening 24 a knurled turning knob 46. The latch arm 44 is rigidly connected to the other end of the rock shaft so that it extends radially therefrom. The bottom wall 23 of the ventilator member 11 is provided with a longitudinally extending slot 47 directly beneath the latch arm 44 and this slot is adapted when the ventilator member is in its closed position to overlie and register with a longitudinally extending slot 48 in the bottom piece 15 of the frame 10. When the ventilator 11 is in its closed position and the rock shaft 43 is turned or rotated so as to swing the latch arm 44 downwards into a position wherein it extends through the slots 47 and 48 the latch arm serves positively to lock the ventilator member against turning and hence holds it in its closed position. When it is desired to shift the ventilator member 11 into its open position the rock shaft is turned or rocked in the reverse direction in order to swing upwards and effect release of the latch arm 44. The knob 46 serves as a medium for turning or rocking the shaft 43. A spiral compression spring 49 is mounted on the rock shaft and is arranged so that one end thereof abuts against the proximal end of the latch arm 44 and its other end abuts against the central portion of the bracket member 42. Such spring urges the knob 46 into frictional engagement with the bracket member and hence tends yieldingly to hold the shaft in the various positions into which it is rocked. By reason of the fact that the latch device 41 is located in the tube-formed ventilator member 11 directly behind the hand opening 24 it is completely housed while at the same time it is readily accessible for manual manipulation.

When it is desired to close the ventilator body B against the entry of outside air the tube-formed ventilator member 11 is swung into its closed position wherein, as previously pointed out, the outer and inner side walls 18 and 19 are in parallel relation with the adjacent side wall of the vehicle body. When the ventilator member is in its closed position the lap joint between the flange 17 and the rear margin of the outer side wall 18 and the lap joint between the frame flange 16 and the front margin of the inner side wall 19 result in closing of the opening b. To lock the ventilator member in its closed position the latch arm 44 of the releasable latch device 41 is swung downwards so as to cause the outer or distal end thereof to fit within the registering slots 47 and 48. When it is desired to admit outside air into the vehicle body the latch arm 44 is swung upwards out of its operative position by turning the rock shaft 43 through the medium of the knurled knob 46. Upon release of the latch device 41 the ventilator member 11 may be swung angularly into its open position wherein the leading portion thereof, including the aperture equipped front wall 20, is disposed exteriorly of the vehicle body and the trailing portion, including the aperture equipped rear wall 21, is disposed interiorly of the vehicle body. When the member 11 is in its open position while the vehicle is travelling in a forward direction the outside air which is directed towards the front wall 20 flows through such wall via the slot-like apertures 31 and is deflected by the outer side wall 18 towards the rear wall 21. After being deflected by the outer side wall 18 the outside air in transit through the interior of the ventilator member 11 flows into the interior of the vehicle body via the apertures 32 in the rear wall 21. Because the apertures 31 and 32 are minute, as hereinbefore pointed out, the outside air which is introduced into the vehicle body through the member 11 is strained or filtered and thus rid of dust and other foreign matter. As heretofore pointed out, the amount of outside air introduced into the vehicle body depends upon the amount of angular displacement of the ventilator member 11 with respect to the frame.

The herein described ventilator effectively and efficiently fulfills its intended purpose and due to its design or arrangement of parts may be manufactured at a low and reasonable cost. It constitutes a seal for its opening when it is in its closed position and serves when in its open position not only to admit outside air into the vehicle body but also to filter or strain such air.

Whereas the ventilator has been described as being adapted to be mounted in the side wall of a vehicle body it is to be understood that it may be mounted in any other wall which is parallel to the normal direction of travel of the vehicle, such, for example, as the top wall of the vehicle body. It is also to be understood that the invention is not to be restricted to the details set forth since these may be modified within the scope of the appended claims without departing from the spirit and scope of the invention.

Having thus described the invention what I claim as new and desire to secure by Letters Patent is:

1. A ventilator adapted for use with a vehicle body having a vertically elongated opening in one of the side walls thereof, and comprising an upstanding tubular member of substantially rectangular cross section shaped substantially conformably to, and fitting within, the opening, embodying substantially imperforate parallel inner and outer side walls and in addition front and rear walls with small sized apertures therein for permitting the passage of air therethrough, and pivotally mounted about a vertical axis so that it is capable of being swung back and forth between a closed position wherein its inner and outer side walls are in substantially parallel relation with said one side wall of the vehicle body, and an open position wherein its apertured front wall is disposed exteriorly of the body and its apertured rear wall is disposed interiorly of said body and said front and rear walls permit the flow of outside air transversely through the member into the body.

2. A ventilator adapted for use with a vehicle body having a substantially rectangular vertically extending opening in one of the side walls thereof, and comprising a rectangular frame shaped conformably to, and fitting within said opening and embodying vertically extending, spaced apart side pieces, and an upstanding tubular member of substantially rectangular cross section disposed in, and substantially the same in size as, the frame, embodying substantially imperforate flat parallel side walls and in addition outwardly and transversely bulged front and rear walls with small sized apertures throughout substantially the entire areas thereof, and pivotally mounted about its longitudinal center so that it is capable of being swung back and forth between a closed position wherein its side walls are in substantially parallel relation with said one side wall of the vehicle body and its front and rear walls are covered by the said side pieces of the frame, and an open position wherein its apertured front wall is disposed exteriorly of said body and its apertured rear wall is disposed interiorly of the body and said front and rear walls permit the flow of outside air transversely through the member into the vehicle body.

3. A ventilator adapted for use with a vehicle body having a substantially rectangular vertically extending opening in one of the side walls thereof, and comprising means forming along the inner margin of the front part of the opening a rearwardly extending flange, means forming along the outer margin of the rear part of the opening a forwardly extending flange, and an upstanding tubular member of substantially rectangular cross section shaped conformably to, and fitting within, the opening, embodying substantially imperforate parallel flat inner and outer side walls and in addition front and rear walls with small sized apertures therein for the passage of air therethrough, and pivotally mounted about its longitudinal center so as to swing back and forth between a closed position wherein its side walls are in substantially parallel relation with said one side wall of the vehicle body, the front margin of its inner side wall is in lapped relation with the first mentioned flange and the rear margin of its outer side wall is in lapped relation with the second mentioned flange, and an open position wherein its front wall is disposed exteriorly of the body and its rear wall is disposed interiorly of the body and the front and rear walls permit the flow of outside air transversely through the member into the body.

4. A ventilator adapted for use with a vehicle body having a substantially rectangular vertically extending opening in one of the side walls thereof, and comprising a rectangular frame shaped conformably to, and fitting within, said opening and embodying vertically extending, spaced apart front and rear side pieces, and having on the inner margin of its front side piece a rearwardly extending flange and on the outer margin of its rear side piece a forwardly extending flange, and an upstanding tubular member of substantially rectangular cross section shaped conformably to, and fitting within, the frame and embodying substantially imperforate flat parallel inner and outer side walls and in addition apertured front and rear walls, and pivotally mounted about its longitudinal center so that it is capable of being swung back and forth between a closed position wherein its front and rear walls are covered by said front and rear side pieces of the frame, the front margin of the inner side wall is in lapped relation with the first mentioned flange and the rear margin of its outer side wall is in lapped relation with the second mentioned flange, and an open position wherein its front wall is disposed exteriorly of the body and the rear wall is disposed interiorly of said body and said front and rear walls permit the flow of air transversely through the member into the vehicle body.

5. A ventilator adapted for use with a vehicle body having a substantially rectangular vertically extending opening in one of the side walls thereof, and comprising a rectangular frame shaped conformably to, and fitting within said opening and embodying vertically extending, spaced apart front and rear side pieces, an upstanding tubular member of substantially rectangular cross section shaped conformably to, and fitting within, the frame, embodying a flat imperforate outer side wall, a flat inner side wall with a hand opening therein, and front and rear walls with small sized apertures throughout substantially the entire areas thereof, and pivotally mounted about its longitudinal center so that it is capable of being swung back and forth between a closed position wherein its inner and outer side walls are in substantially parallel relation with said one side wall of the vehicle body and its front and rear walls are covered by said front and rear side pieces of the frame, and an open position wherein its front wall is disposed exteriorly of the body and its rear wall is disposed interiorly of said body and said front and rear walls permit the flow of outside air transversely through the member into the vehicle body, and a latch device disposed in the tubular member adjacent the hand opening in said inner side wall and adapted when the member is in its closed position to lock the member against rotation relatively to the frame.

6. A ventilator adapted for use with a vehicle body having a substantially rectangular vertically extending opening in one of the side walls thereof, and comprising a rectangular frame shaped conformably to, and fitting within, said opening embodying vertically extending, spaced apart front and rear side pieces and having along the inner margin of its front side piece a rearwardly extending flange and along the outer margin of its rear side piece a forwardly extending flange, an upstanding tubular member of substantially rectangular cross section shaped conformably to, and fitting within, the frame, embodying a flat imperforate outer side wall, a flat inner side wall with a hand opening therein, and front and rear walls with small sized apertures therein for the passage of air therethrough, and pivotally mounted about its longitudinal center so that it is capable of being swung back and forth between a closed position wherein its front and rear walls are covered by the front and rear side pieces of the frame, the front margin of the inner side wall is in lapped relation with the first mentioned flange and the rear margin of its outer side wall is in lapped relation with the second mentioned flange, and an open position wherein its front wall is disposed exteriorly of the body and the rear wall is disposed interiorly of said body and said front and rear walls permit the flow of air transversely through the member into the vehicle body, and a latch device disposed in the tubular member adjacent the hand opening in said inner side wall and adapted when the member is in its closed position to lock the member against rotation relatively to the frame.

KENNETH RANDALL.

REFERENCES CITED

The following references are of record in the file of this patent:

UNITED STATES PATENTS

| Number | Name | Date |
| --- | --- | --- |
| 495,288 | Almy | Apr. 11, 1893 |
| 1,569,667 | Neilson | Jan. 12, 1926 |
| 1,831,498 | Kraft | Nov. 10, 1931 |
| 1,980,039 | Crowell | Nov. 6, 1934 |
| 2,081,486 | Kraft | May 25, 1937 |
| 2,087,777 | Morrison | July 20, 1937 |
| 2,248,329 | Bell, Jr. | July 8, 1941 |
| 2,301,985 | Vagliani | Nov. 17, 1942 |

FOREIGN PATENTS

| Number | Country | Date |
| --- | --- | --- |
| 759,425 | France | Nov. 16, 1933 |